United States Patent [19]

Lesar

[11] Patent Number: 5,207,351
[45] Date of Patent: May 4, 1993

[54] TRAY DISPENSING APPARATUS AND METHOD

[75] Inventor: Nick J. Lesar, Palmyra, Wis.

[73] Assignee: Weiler and Company, Inc., Whitewater, Wis.

[21] Appl. No.: 759,889

[22] Filed: Sep. 13, 1991

Related U.S. Application Data

[62] Division of Ser. No. 472,622, Jan. 30, 1990, abandoned.

[51] Int. Cl.⁵ .............................................. G07F 11/24
[52] U.S. Cl. ................... 221/223; 221/224; 221/301
[58] Field of Search .............. 221/221, 223, 224, 297, 221/301

[56] References Cited

U.S. PATENT DOCUMENTS

| | | | |
|---|---|---|---|
| 1,649,365 | 11/1927 | Poling et al. | 221/297 X |
| 2,341,870 | 2/1944 | Johnston | 29/69 |
| 2,365,916 | 12/1944 | Terry et al. | 221/297 X |
| 3,283,955 | 11/1966 | Crabtree et al. | 221/221 X |
| 3,504,639 | 4/1970 | Lilien | 107/15 |
| 3,668,821 | 6/1972 | Benson et al. | 53/123 |
| 4,098,055 | 7/1978 | Calvert | 53/160 |
| 4,173,107 | 11/1979 | Wilson | 53/534 |
| 4,175,455 | 11/1979 | Genis et al. | 83/110 |
| 4,196,646 | 4/1980 | Mukumoto | 83/88 |
| 4,372,008 | 2/1983 | Sandberg | 17/32 |
| 4,578,930 | 4/1986 | Simelunas et al. | 53/534 |
| 4,741,458 | 5/1988 | Odorici | 221/297 X |
| 4,762,039 | 8/1988 | Rimmele | 83/37 |
| 4,776,146 | 10/1988 | Whitehouse | 53/58 |
| 4,903,821 | 2/1990 | Yamaguchi | 198/550.7 |
| 5,024,048 | 6/1991 | Moore | 53/534 |

FOREIGN PATENT DOCUMENTS

| | | |
|---|---|---|
| 0084291 | 12/1982 | European Pat. Off. . |
| 0109720 | 11/1983 | European Pat. Off. . |
| 0362099 | 9/1989 | European Pat. Off. . |
| 2123906 | 9/1974 | Fed. Rep. of Germany . |
| 2854863 | 4/1980 | Fed. Rep. of Germany . |
| 3232185 | 3/1984 | Fed. Rep. of Germany . |
| 3617275 | 11/1987 | Fed. Rep. of Germany . |

*Primary Examiner*—D. Glenn Dayoan
*Assistant Examiner*—Dean A. Reichard
*Attorney, Agent, or Firm*—Andrus, Sceales, Starke & Sawall

[57] ABSTRACT

A portioning mechanism for supplying a strand of ground meat to a conveyor includes a positive displacement pump supplying a grinder head, which outputs ground meat to the conveyor. The strand of meat on the conveyor has a predetermined cross-section and density, and a portioning system is provided for intermittently separating the ground meat on the conveyor in predetermined lengths, for providing a relatively accurate weight of ground meat portions. A tray supply system positions empty trays at the outlet of the conveyor, and the ground meat portions are deposited onto the trays for subsequent packaging.

6 Claims, 10 Drawing Sheets

TRAY DISPENSING APPARATUS AND METHOD

This application is a division of application Ser. No. 07/472,622 filed Jan. 30, 1990, now abandoned.

BACKGROUND AND SUMMARY

This invention relates to a system for portioning material, such as ground meat, as the material is being conveyed at a substantially constant rate of speed, and for thereafter depositing the portioned material on a tray or the like.

In the past, a labor-intensive and relatively inaccurate manual operation has been employed to portion material, such as ground meat, as the material is conveyed on a conveyor belt or the like. The ground meat is output onto the conveyor belt in a ribbon or strand having a substantially constant cross-section, and thereby a controlled density. The strand of meat is manually cut to a predetermined length with the assistance of evenly spaced markings on the conveyor belt, thereby providing a portion having a predetermined weight according to its length. The portion is then placed onto a tray and wrapped.

The present invention provides an automatic system for providing a portion of material, such as ground meat, having a predetermined weight according to its length, and for automatically depositing the individual meat portions onto a tray.

In accordance with one aspect of the invention, a mechanism for portioning material includes material supply means for depositing a strand of material onto conveying means for moving the material in a first direction. Portioning means is provided for intermittently separating the material at predetermined intervals. The conveying means uninterruptably moves the material in the first direction at a substantially constant rate of speed, and the portioning means intermittently separates the material as it is being moved in the first direction by the conveying means. In this manner, portioning of the material can be accomplished without interruption of the conveying means. In a preferred embodiment, the portioning means comprises carriage means selectively movable in the first direction at the same rate of speed as the conveying means. Selectively actuable knife means is mounted to the carriage means, and the knife means acts to separate the material when the carriage means is moving in the first direction. The carriage means is preferably reciprocably movable between a first position and a second position, alternately moving in the first direction and in a second direction opposite thereto between the first and second positions. The conveying means is preferably a belt conveyor, and the knife means provides a downward cutting stroke for severing the material against the conveyor belt. Thereafter, the knife means undergoes an upward return stroke during movement of the carriage means in the second direction, for readying the knife for another downward cutting stroke. Reciprocating movement of the carriage means is preferably provided by a reciprocating mechanism including means traveling in the first direction at the same rate of speed as the conveying means; means traveling in the second direction, and means interconnected with the carriage means for alternately selectively coupling the carriage means with the first direction traveling means and the second direction traveling means, respectively. In a preferred embodiment, the means traveling in the first direction and the means traveling in the second direction comprise a timing belt providing an upper run and a lower run, one of which travels in the first direction and the other of which travels in the second direction. The means interconnected with the carriage means selectively couples the carriage means to the upper and lower runs of the timing belt for alternately moving the carriage means in the first and second directions. The timing belt is preferably driven by the same drive mechanism as the conveying means so as to ensure that the run of the timing belt traveling in the first direction travels at the same rate of speed as the conveyor. First and second clutches are preferably interconnected with the carriage means for selectively engaging the first direction traveling means and the second direction traveling means, respectively. With the timing belt system mentioned previously, the first and second clutches are preferably mounted to a shuttle which provides passages for the upper and lower runs of the timing belt. The first and second clutches preferably comprise selectively actuable clutch plates mounted to the piston rods of clutch cylinders, for alternately coupling and decoupling the shuttle to and from the upper and lower runs of the timing belt. In this manner, reciprocating movement of the carriage is provided. An actuating system is employed for controlling actuation of the first and second clutches, and thereby their engagement with the timing belt, and also for controlling movement of the knife. The actuating system is preferably pneumatically operated, and includes selectively placed air actuator valves for controlling movement of the clutches and the knife.

In accordance with another aspect of the invention, a mechanism for depositing an article, such as a tray, by gravity onto a surface, such as a tray supply conveyor, comprises a receptacle adapted to receive a stack of articles. Dispensing means is disposed toward the lower end of the receptacle for depositing the articles one by one onto a surface therebelow from the bottom of the stack of articles. The dispensing means deposits the articles by allowing the lowermost article to fall onto the surface while supporting the articles in the stack above the lowermost article. In a preferred embodiment, the dispensing means comprises first movable stack support means movable into and out of engagement with the lowermost article in the stack, and second movable stack support means movable into and out of engagment with the tray above the lowermost tray in the stack. When the first stack support means is engaged with the lowermost article for supporting it along with the remainder of the stack, the second stack support means is out of engagement with the stack. Upon movement of the second stack support means into engagement with the article above the lowermost article, for supporting it along with the remainder of the stack, the first stack support means is moved out of engagement with the lowermost article, thus releasing it to fall onto the surface. Both the first and second stack support means preferably comprise spaced pairs of movable members such as support plates, with the stack of articles disposed therebetween. The support plates are preferably mounted in horizontal slots formed in a pair of spaced support blocks, and actuator means controls the retraction or extension of the plate members in a predetermined sequence. The actuator means preferably comprises a vertically movable actuator plate having cam slots formed therein, with the horizontally movable support plates having cam followers mounted in the cam slots for controlling extension and retraction thereof. A pivotable tray kicker is preferably provided for assisting in forcing the lowermost tray downwardly onto the lower surface.

In accordance with yet another aspect of the invention, the portioning system and the tray dispenser are incorporated into a single apparatus in which the trays are supplied to the portioning apparatus in a manner so that the portions of material are deposited onto the trays upon discharge from the material conveyor.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
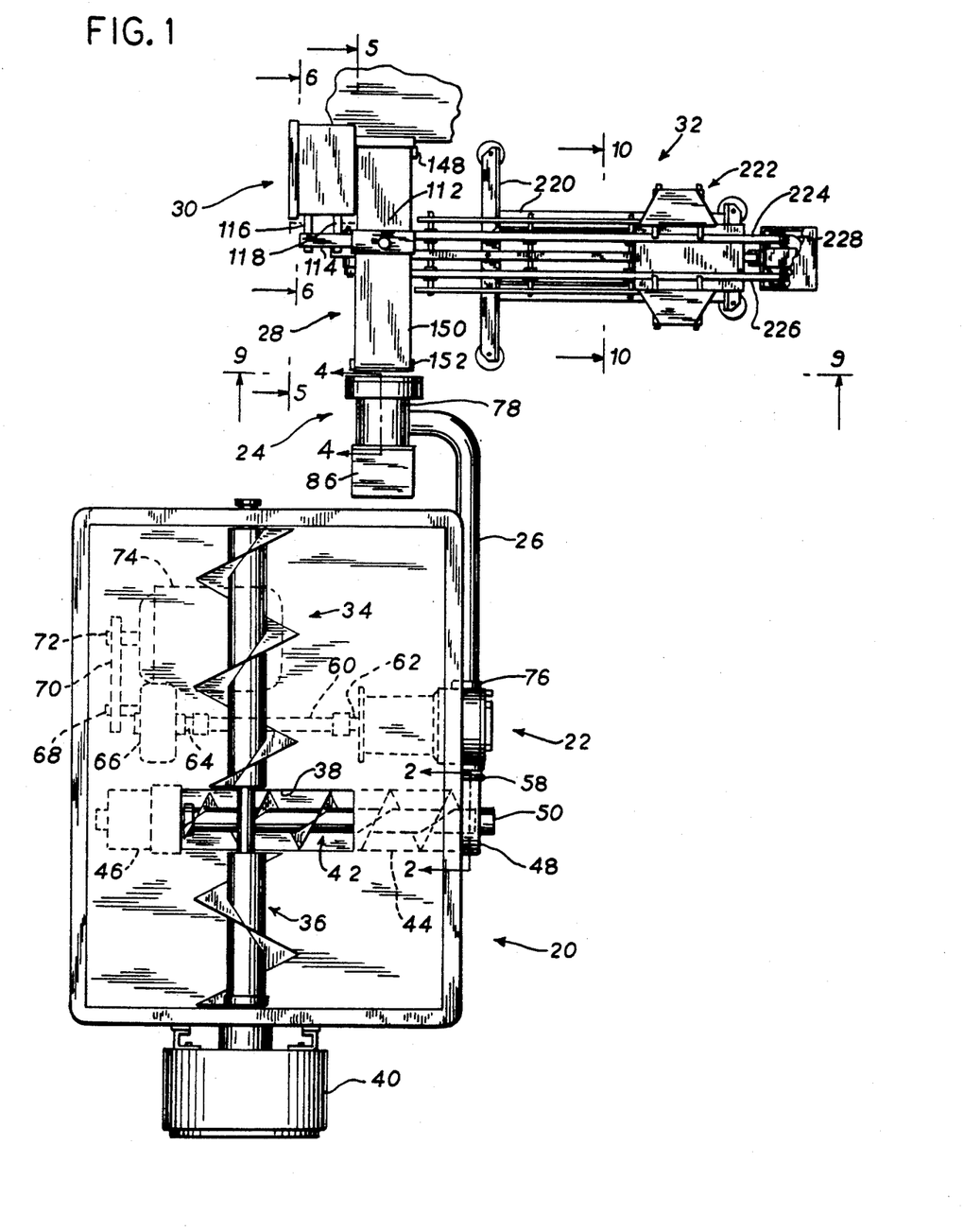
FIG. 1 is a top plan view of a material portioning system constructed according to the invention, including a hopper for receiving meat to be ground, a positive displacement pump for supplying the meat to a grinder head, a conveyor onto which the meat is deposited from the grinder head, an automatic portioning apparatus for separating the meat at predetermined intervals, and a tray supply mechanism for providing a tray onto which the portioned meat is deposited.

As shown in FIG. 1, a system for accurately portioning ground meat and depositing the ground meat portions onto a tray broadly includes a hopper 20 which supplies mixed meat to a positive displacement pump 22 feeding a sizing head 24 through a pipe 26. A conveyor shown generally at 28 is positioned so as to receive ground meat from the outlet of sizing head 24, and a portioning apparatus 30 separates the meat supplied to conveyor 28 into portions having a predetermined length. A tray dispenser apparatus 32 supplies trays below conveyor 28, which are supplied to the discharge of conveyor 28 for receiving a portion of the ground meat as it is discharged therefrom.

Hopper 20 is of the type as generally described in Lesar U.S. Pat. No. 4,823,936, the disclosure of which is hereby incorporated by reference. Generally, hopper 20 has a V-shaped cross-section, with a discharge auger having oppositely flighted portions 34, 36 for supplying mixed meat to an outlet 38. A motor 40 mounted to the end wall of hopper 20 drives the discharge auger. An unload screw 42 is rotatably mounted within a tubular housing 44 mounted below hopper 20, which has its inlet in communication with outlet 38 of hopper 20 for receiving mixed meat therefrom. A motor 46 drives unload screw 42 in a direction so as to move the mixed meat rightwardly away from hopper outlet 38 and toward the discharge of tubular housing 44, at which is positioned a right angle transfer shroud 48 to which a bearing member 50 is mounted.

Figures 2, 3:
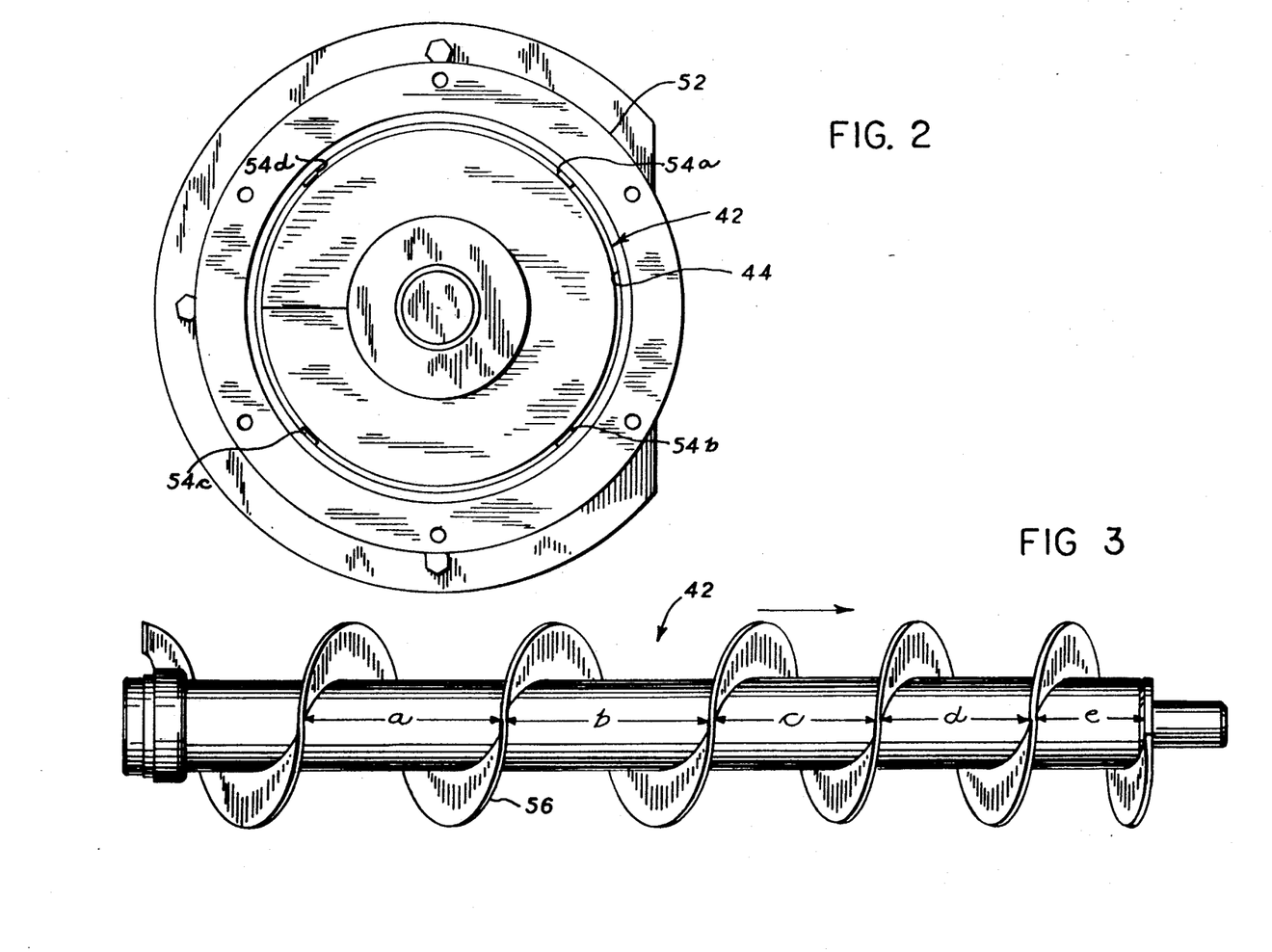
FIG. 2 is a partial sectional view taken generally along line 2—2 of FIG. 1.
FIG. 3 is a side elevation view of the discharge auger of the hopper which supplies meat to the pump.

Reference is briefly made to FIGS. 2 and 3, which illustrate certain details of the mechanism for unloading hopper 20. As shown in FIG. 2, tubular housing 44 is provided with an end plate 52, which is adapted to be connected to shroud 48. The inner wall of tubular housing 44 is provided with a series of longitudinally extending flutes shown at 54a, 54b, 54c and 54d. During rotation of unload screw 42 within housing 44 for advancing meat therethrough, flutes 54a-54d prevent the meat from spinning within housing 44, providing substantially straight-line movement of the meat therethrough.

Referring to FIG. 3, unload screw 42 is provided with spiral flighting 56. As is known, flighting 56 acts to move meat within tubular housing 44 upon rotation of unload screw 42, rightwardly along screw 42 toward the discharge of housing 44. Flighting 56 is arranged on the center shaft of unload screw 42 so that its center-to-center pitch decreases toward the end of unload screw 42 adjacent the discharge of housing 44. Illustratively, dimensions a and b are nine inches, while dimensions c and d are six and three-quarter inches, and dimension e four and one-half inches. It has been found that this feature compresses the mixed meat as it approaches the discharge of housing 44, so as to squeeze out any air which may be present in the mixed meat and force the air rearwardly for ultimate discharge through hopper outlet 38. In this manner, substantially all air is eliminated from the mixed meat once it reaches shroud 48 and a constant density of meat is supplied to the inlet of pump 22.

Referring back to FIG. 1, shroud 48 receives the compressed mixed meat from the discharge of tubular housing 44, and routes the meat toward its outlet formed in a side of shroud 48. A gasket assembly 58 is provided between the outlet of shroud 48 and the inlet of positive displacement pump 22.

Pump 22 is mounted to a pedestal supporting hopper 20, and is driven by a drive shaft 60 extending between the input shaft 62 of pump 22 and the output shaft 64 of a parallel shaft reducer 66. In the event there is a difference in elevation between pump input shaft 62 and reducer output shaft 64, a double universal joint type drive shaft may be employed. Reducer 66 receives power through its input shaft 68, which is connected through a belt 70 to the output shaft 72 of a motor 74.

Pump 22 is a positive displacement double rotary lobe type pump, and may representatively be such as manufactured by the Waukesha Pump Company under its Model No. 234.

Pipe 26 is connected to the outlet 76 of pump 22 for receiving mixed meat under positive pressure therefrom. The outlet of pipe 26 is connected to a housing 78 of sizing head 24.

Figure 4:
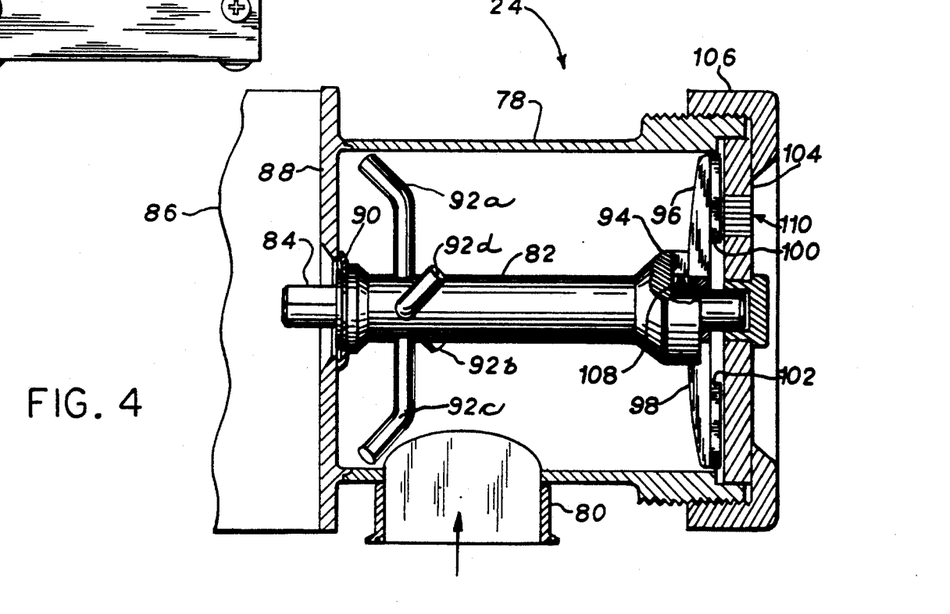
FIG. 4 is a partial sectional view taken generally along line 4—4 of FIG. 1.

Referring to FIG. 4, the mixed meat is supplied to an inlet 80 in communication with the interior of sizing head housing 78. A drive shaft 82 is rotatably mounted within housing 78, and is provided at its leftward end with a pin 84 engageable by an outlet member associated with a motor 86 mounted to the end plate 88 of housing 78, for imparting rotation to drive shaft 82. A seal 90 is provided between the interior of housing 78 and motor 86.

The rearward end of drive shaft 82 is provided with a plurality of agitating arms 92a, 92b, 92c and 92d, which are provided with curved end portions. The forward end of drive shaft 82 is provided with a drive lug portion 94, which is engageable with a series of knife holders, such as shown at 96, 98. A series of knives, such as shown at 100, 102, are mounted to the series of knife holders, and are disposed adjacent the inner surface of an orifice plate 104. Orifice plate 104 is retained on housing 78 by a plate retaining ring 106 having internal threads engageable with external threads provided on housing 78. A Belleville-type spring washer 108 is provided between a bore in the end of lug portion 94 of drive shaft 82 and the knife holders, such as 96, 98, for biasing the knives, such as 100, 102, toward the inner surface of orifice plate 104.

Orifice plate 104 is provided with a series of orifices 110 therethrough, which are formed in a predetermined pattern corresponding to the desired final cross-sectional shape of the meat portions.

Operation of sizing head 24 is generally as follows. Mixed meat input into the interior of sizing head housing 78 passes therethrough toward the grinding assembly consisting of knives 100, 102 and orifice plate 104. The action of the knives against the orifice plate cuts the meat as it is being fed under pressure through orifices 110 in plate 104, in a known manner. Agitating arms 92a–92d act to agitate the meat in the interior of housing 78 for ensuring that there are no stagnant areas of flow of the meat through housing 78, mixing any meat which may tend to flow toward the corners of housing 78 adjacent its end plate 88 into the flow of meat toward orifices 110. This action outputs a strand or ribbon of ground meat through orifices 110. The positive pressure provided to the mixed meat entering housing 78 provides a highly controlled uniform density of meat output through orifices 110, with the cross-sectional area of the output strand being substantially constant. The density of the strand output from sizing head 24 can be carefully controlled by controlling the operating characteristics of pump 22.

Referring again to FIG. 1, the strand of meat output from sizing head 24 is received on the rear upper run conveyor 28, which is a conventional meat processing conveyor. As noted previously, portioning apparatus 30 acts on the meat carried by conveyor 28 for dividing it into portions of predetermined length. With the carefully controlled density of the ground meat supplied from sizing head 24, the portions of predetermined length have a substantially uniform weight. Portioning apparatus 30 generally includes a reciprocating knife assembly 112 mounted to a carrier block 114, which is fixed at the ends of a pair of shafts 116, 118.

Figure 5:
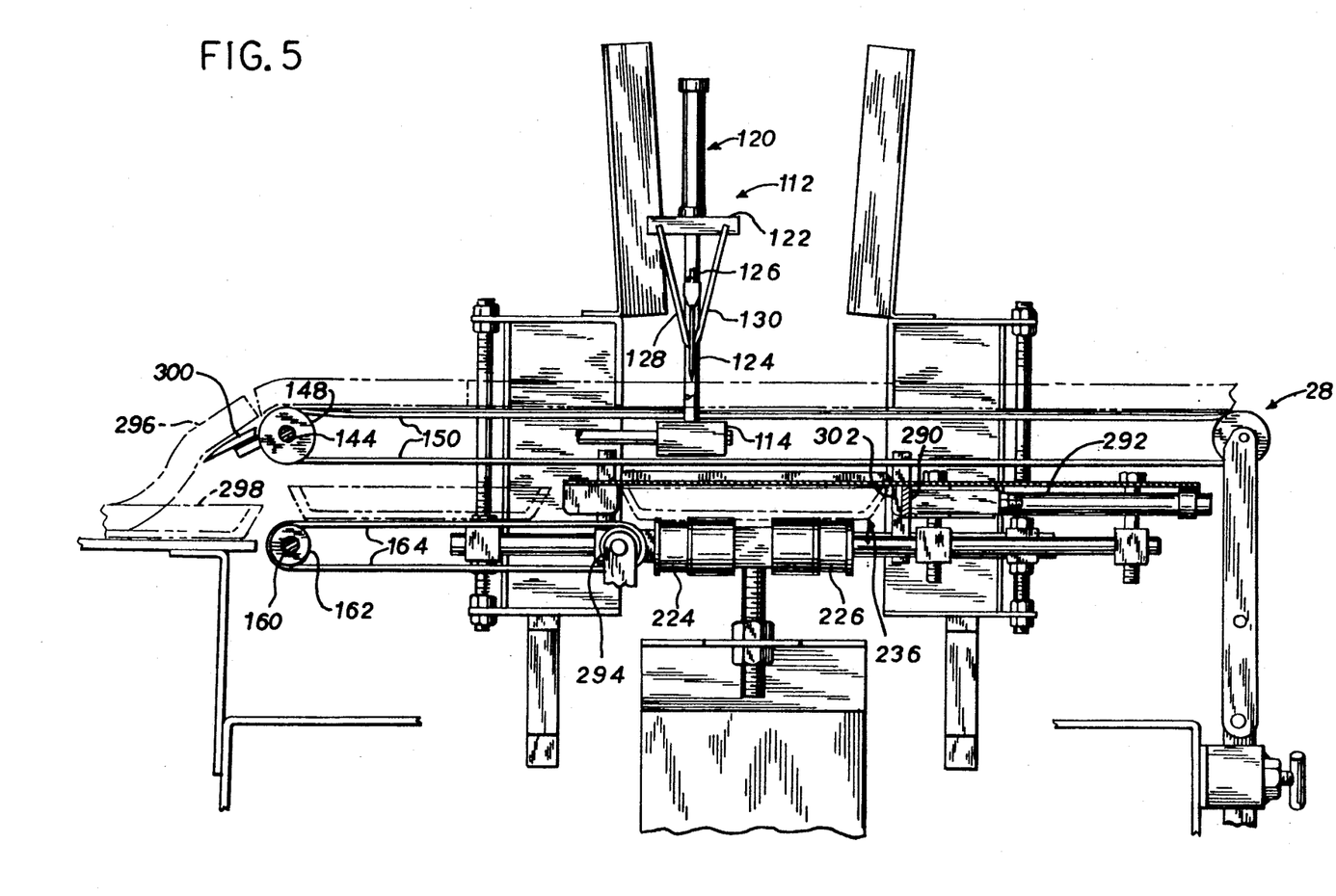
FIG. 5 is a partial side elevation view, reference being made to line 5—5 of FIG. 1.
Figure 9:
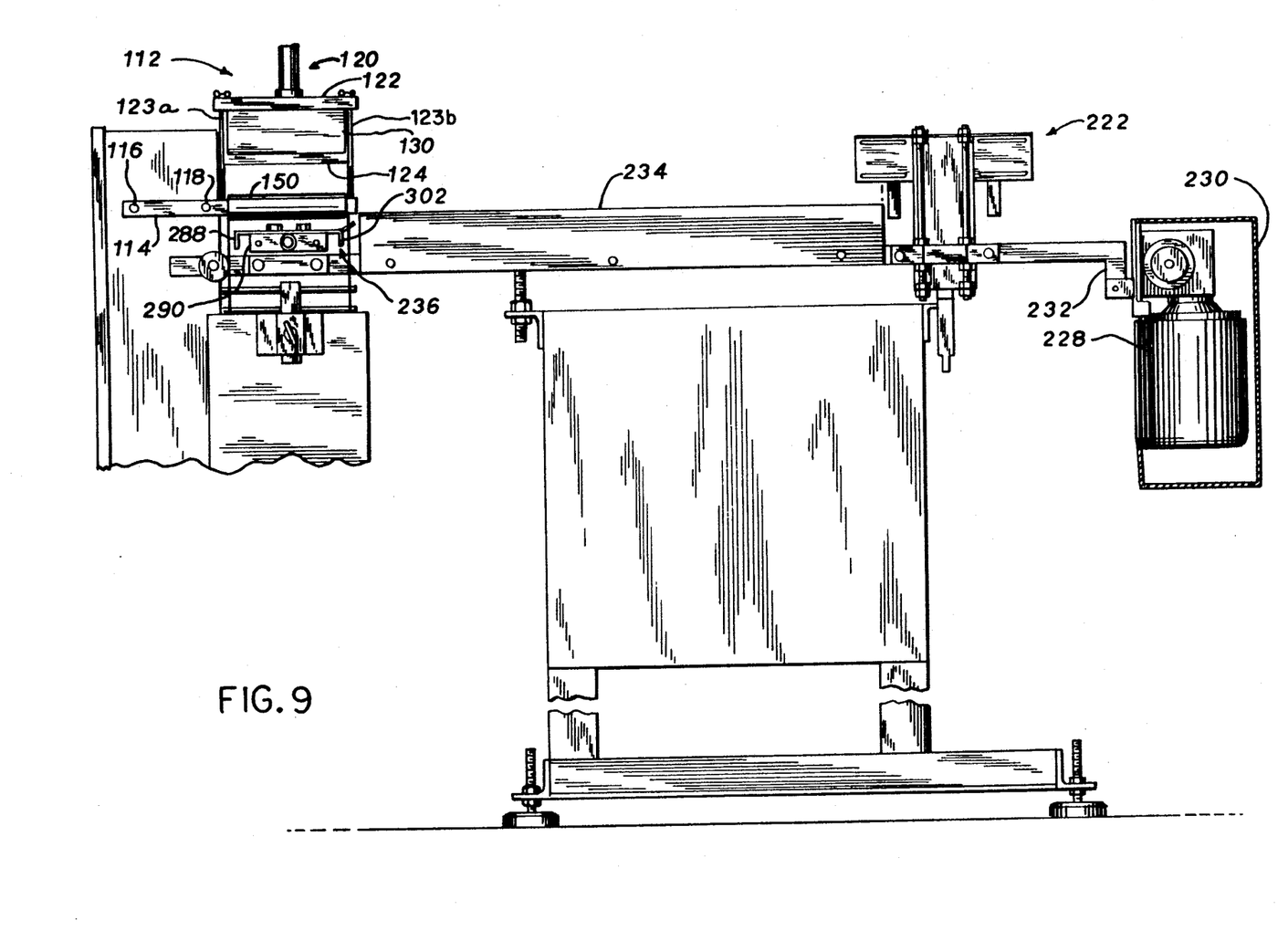
FIG. 9 is an elevation view showing the tray supply system and a partial end elevation view of the portioning system, reference being made to line 9—9 of FIG. 1.

Knife assembly 112 is illustrated in FIGS. 5 and 9. As shown, knife assembly 112 includes a pneumatic cylinder 120 mounted to an upper block 122. A pair of supports 123a, 123b extend between block 114 and upper block 122 for supporting knife assembly 112 above conveyor 28. A blade 124 is connected to the end of the retractable and extendible rod 126 associated with cylinder 120. A pair of wipers 128, 130 extend at an angle downwardly from block 122. Blade 124 is movable downwardly and upwardly upon extension and retraction of rod 126. A full downward stroke of cylinder 120 moves blade 124 downwardly against the upper run of conveyor 28 for severing the ground meat carried thereby, in a manner to be explained.

Figures 6, 7:
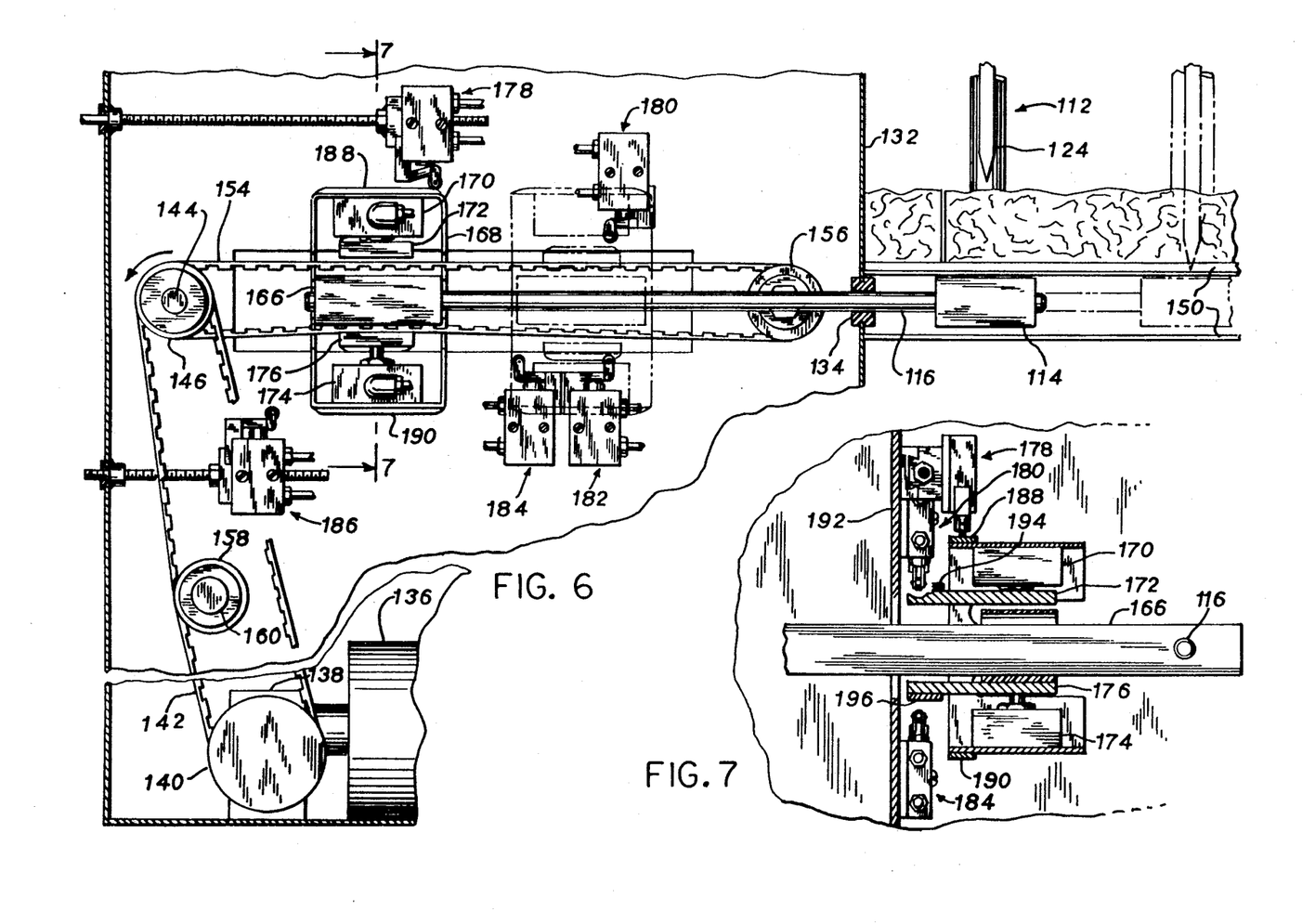
FIG. 6 is a partial elevation view of the internal components of the portioning system shuttle and actuator system, reference being made to line 6—6 of FIG. 1.
FIG. 7 is a partial sectional view taken generally along line 7—7 of FIG. 6.

Reference is now made to FIG. 6, which illustrates portioning apparatus 30 in detail. The operative components of portioning system 30 are housed within a cabinet 132 and the wall of cabinet 132 is provided with a pair of openings through which shafts 116, 118 extend. Bushings, such as shown at 134, are provided in the openings in the cabinet wall for accomodating reciprocating sliding movement of shafts 116, 118 relative to cabinet 132.

A drive motor 136 is contained within cabinet 132, and through a gear box 138 drives a timing belt pulley 140. A timing drive belt 142 is trained about pulley 140 and driven thereby in response to operation of motor 136. An upper rotatable shaft 144 is driven by drive belt 142 through a pulley 146, and extends exteriorly of cabinet 132. a drive roller 148 (FIG. 1) is connected to the exterior portion of shaft 144, for driving the conveyor belt, shown at 150, about an idle roller shown at 152.

Referring again to FIG. 6, another pulley identical to pulley 146 is mounted to shaft 144 behind pulley 146, and drives a timing belt 154, which is trained about an idle roller 156.

Drive belt 142 also engages a pulley 158 mounted to a shaft 160, which drives a tray conveyor drive pulley 162 (FIG. 5) for driving a tray conveyor belt 164, as will be explained.

Referring again to FIG. 6, a shuttle block 166 is mounted to the leftward end of rails 116, 118. Shuttle block 166 is disposed between the upper and lower runs of timing belt 154. A frame assembly 168 is mounted to shuttle 166. An upper short stroke pneumatic cylinder 170 having an extendible rod to which a clutch plate 172 is connected, is mounted to the upper portion of frame 168 such that the lower surface of clutch plate 172 is adjacent the upper run of timing belt 154. Timing belt 154 thus passes through a passage defined by the lower surface of clutch plate 152 and the upper surface of shuttle block 166. In a similar manner, a lower cylinder 174 having an extendible and retractable rod to which a clutch plate 176 is connected, is mounted to the lower portion of frame 168. The lower run of timing belt 154 passes through a passage defined by the upper surface of clutch plate 176 and the lower surface of shuttle block 166. As will be explained, clutch plates 172, 176 are alternately actuated so as to alternately clamp the upper and lower runs of timing belt 154 against shuttle block 166. When cylinder 170 is actuated so as to extend its rod and clamp the upper run of timing belt 154 between clutch plate 172 and shuttle block 166, leftward (forward) movement of shuttle 166 results, thus drawing shafts 116, 118 leftwardly and resulting in forward movement of knife assembly 112. When the supply of air to cylinder 170 is cut off so as to retract clutch plate 172, cylinder 174 is actuated so as to extend its rod and clutch plate 176, so as to clamp the lower run of timing belt 154 between clutch plate 176 and the lower surface of shuttle block 166. This causes rightward (rearward)

movement of shuttle block 166, thereby extending shafts 116, 118 and moving knife assembly 112 rearwardly. A series of pneumatic actuators, shown at 178, 180, 182, 184 and 186 are positioned within cabinet 132 for controlling actuation of the various pneumatically operated components of the system. Actuators 178, 186 may be such as manufactured by the Festo Corporation under Part No. R-3-M5. Actuators 178-186 are supplied with pressurized air and, upon actuation, allow passage of pressurized air therethrough.

Actuator 178 controls operation of a pneumatically operated tray pusher assembly associated with tray dispenser 32, which will be explained. Actuator 180 controls actuation of upper cylinder 170 and its associated clutch plate 172, and the position of actuator 180 determines the rearwardmost extent of travel of shuttle block 166 and accordingly knife assembly 112. Actuator 182 controls the downstroke of knife blade 124, and actuator 184 controls the upstroke of knife blade 124. Actuator 186 controls cylinder 174 and its associated clutch plate 176, for providing rearward movement of shuttle block 166 and the position of actuator 186 determines the forwardmost extent of travel of shuttle block 166 and knife assembly 112.

The position of actuators 178 and 176 is adjustable within cabinet 132. Adjustment of actuator 186 results in shortening or lengthening of the portion of meat provided by portioning apparatus 30.

An actuator surface 188 is provided on top of the upper surface of frame assembly 168, for engaging the roller of actuator 178 for providing actuation thereof. Similarly, an actuator surface 190 is provided on the lower surface of frame assembly 168, for engaging the roller of actuator 186 to control actuation thereof.

Referring to FIG. 7, clutch plate 172 is provided with an extension portion extending inwardly toward a plate 192 provided within cabinet 132, and to which actuators 178-186 are mounted. The upper surface of the inwardly extending portion of clutch plate 172 is provided with an actuator surface, a portion of which is shown at 194. Actuator surface 194 physically extends to the end of the inwardly extending portion of clutch plate 172, so as to be in line with the roller of actuator 180. In a similar manner, an inwardly extending portion of clutch plate 176 is provided with an actuator surface 196, which is in line with the roller of actuator 184. As shown, when cylinder 174 is actuated so as to move clutch plate 176 against the lower run of belt 154, actuator surface 196 mounted to clutch plate 176 is moved upwardly so that it clears the roller of actuator 184 during rearward movement of shuttle 166. During such rearward movement of shuttle block 166, actuator surface 194 mounted to clutch plate 172 is at an elevation at which it engages the roller of actuator 180 so that, when such engagement occurs, cylinder 170 is actuated so as to extend clutch plate 172 and to engage the upper run of belt 154 with shuttle block 166. As will be explained, this releases cylinder 174 and its rod thus retracts so as to move clutch plate 176 downwardly. Such downward movement of clutch plate 176 causes engagement of actuator surface 196 associated therewith with the roller of actuator 182, so as to initiate the downstroke of knife blade 124. Due to the clamping of the upper run of timing belt 154 between clutch plate 172 and the upper surface of shuttle block 166, forward movement of shuttle block 166 is provided and actuator surface 196 then engages the roller of actuator 184, which intiates the upstroke of knife blade 124. This cycle repeats upon continued back and forth movement of shuttle block 166.

Figure 8:
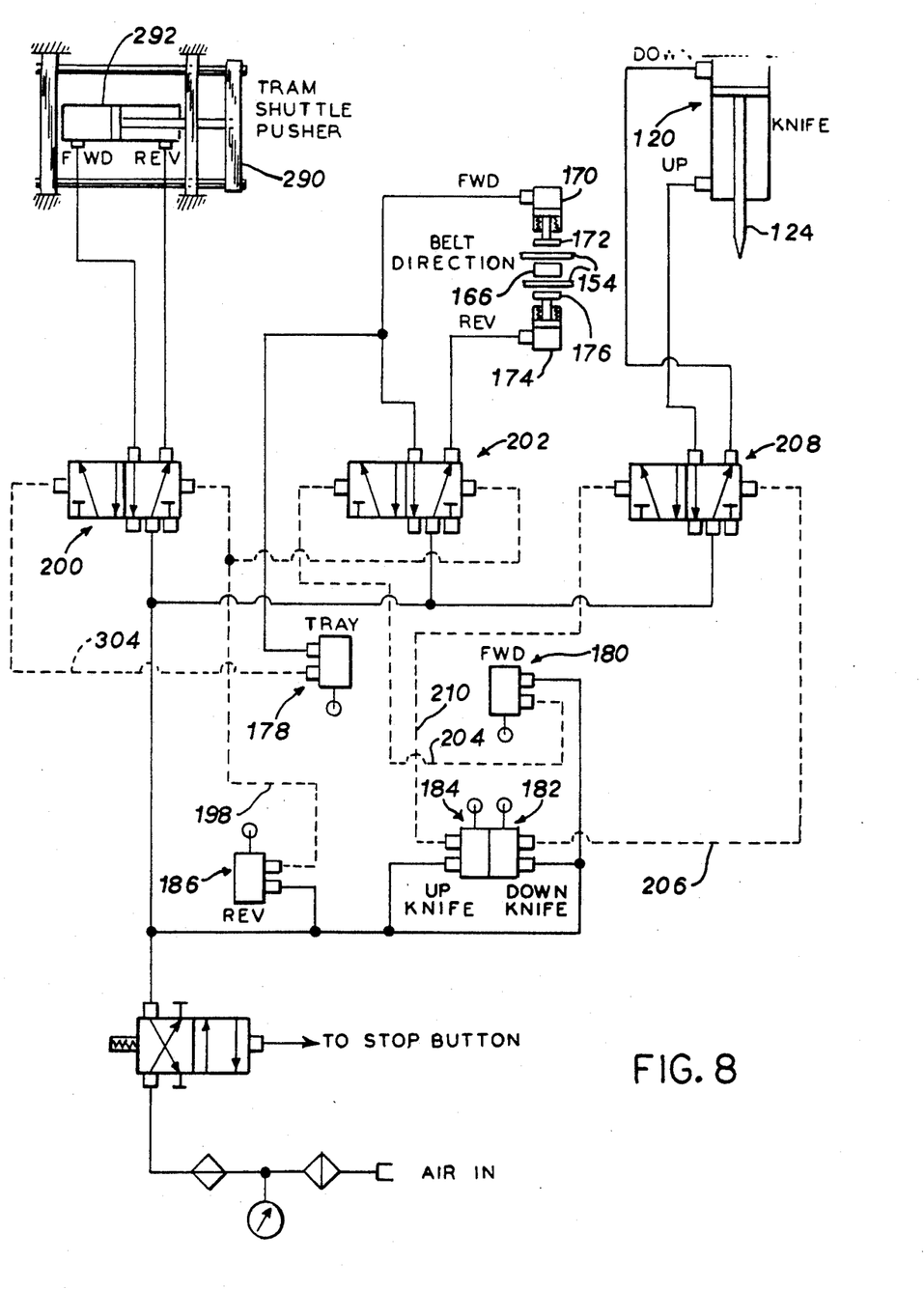
FIG. 8 is a schematic view showing the pneumatic system operating the portioning system and a portion of the tray supply mechanism.

Reference is now made to FIG. 8 which schematically illustrates the pneumatic actuation system controlling lateral movement of shuttle block 166, and also up and down movement of knife blade 124. When shuttle block 166 is at its forward position, actuator 178 is engaged so as to supply air pressure through a pilot line 198 to the right end of a valve 200 and also to the right end of a valve 202. The action of valve 200 will later be explained. As to valve 202, it is moved to its position as shown where pressurized air is supplied to cylinder 174 for extending clutch plate 176 and engaging the lower run of belt 154 to initiate rearward movement of shuttle block 166. Such movement continues until actuator 180 is engaged, and pressure is then supplied through a line 204 to the left end of valve 202. This moves valve 204 rightwardly, and the supply of pressurized air to cylinder 174 is cut off while at the same time pressurized air is supplied to cylinder 170. This moves clutch plate 172 downwardly so as to engage the upper run of belt 154, causing forward movement of shuttle block 166.

It will be noted that clutch plates 172, 176 are spring biased toward their retracted positions.

Upon cutting off the supply of pressurized air to cylinder 174, and thereby retraction of clutch plate 176, actuator 182 is engaged so as to supply pressurized air through a line 206 to the right end of a valve 208. This moves valve 208 to its position as shown, where pressurized air is provided to the piston end of knife cylinder 120, resulting in downward movement of knife blade 124. After a small amount of forward movement of shuttle block 166, which is sufficient to allow a full downward stroke of knife blade 24, actuator 184 is engaged so as to supply pressurized air through a line 210 to the left end of valve 208. This moves valve 208 rightwardly, so that the supply of pressurized air to the piston end of cylinder 120 is cut off, while simultaneously pressurized air is supplied to the rod end of cylinder 120 for initiating the upstroke of knife blade 124. Leftward movement of shuttle block 166 continues, resulting in engagement of actuator 178, the result of which will later be explained, until engagement of actuator 186. This again causes actuation of cylinder 174 and engagement of clutch plate 176 with the lower run of belt 154, initiating another cycle of shuttle block 166 and knife blade 124.

While the actuator and clutch system has been described as a pneumatic cylinder and actuator arrangement, it is understood that other satisfactory systems may be employed. For example, an electrical system incorporating a series of limit switches and solenoids may be used to selectively couple and decouple the shuttle block to and from the upper and lower runs of the timing belt.

Referring again to FIG. 1, tray dispenser 32 generally includes supporting framework such as shown at 220, a tray hopper 222, and a pair of continuously operating conveyor belts 224, 226 driven by a motor 228. Generally, the trays are dispensed one at a time downwardly from hopper 222 onto the upper surface of belts 224, 226, and are conveyed leftwardly into a tray receiving station located below the lower run of conveyor belt 150.

As shown in FIG. 9, motor 228 is contained within an enclosure 230 pivotably mounted to a bracket 232, which allows proper tension to be maintained on belts 224, 226. A fence 234 is provided between hopper 222 and the receiving station, shown at 236, where the trays are supplied by belts 224, 226 below the lower run of belt 150.

Figure 10:
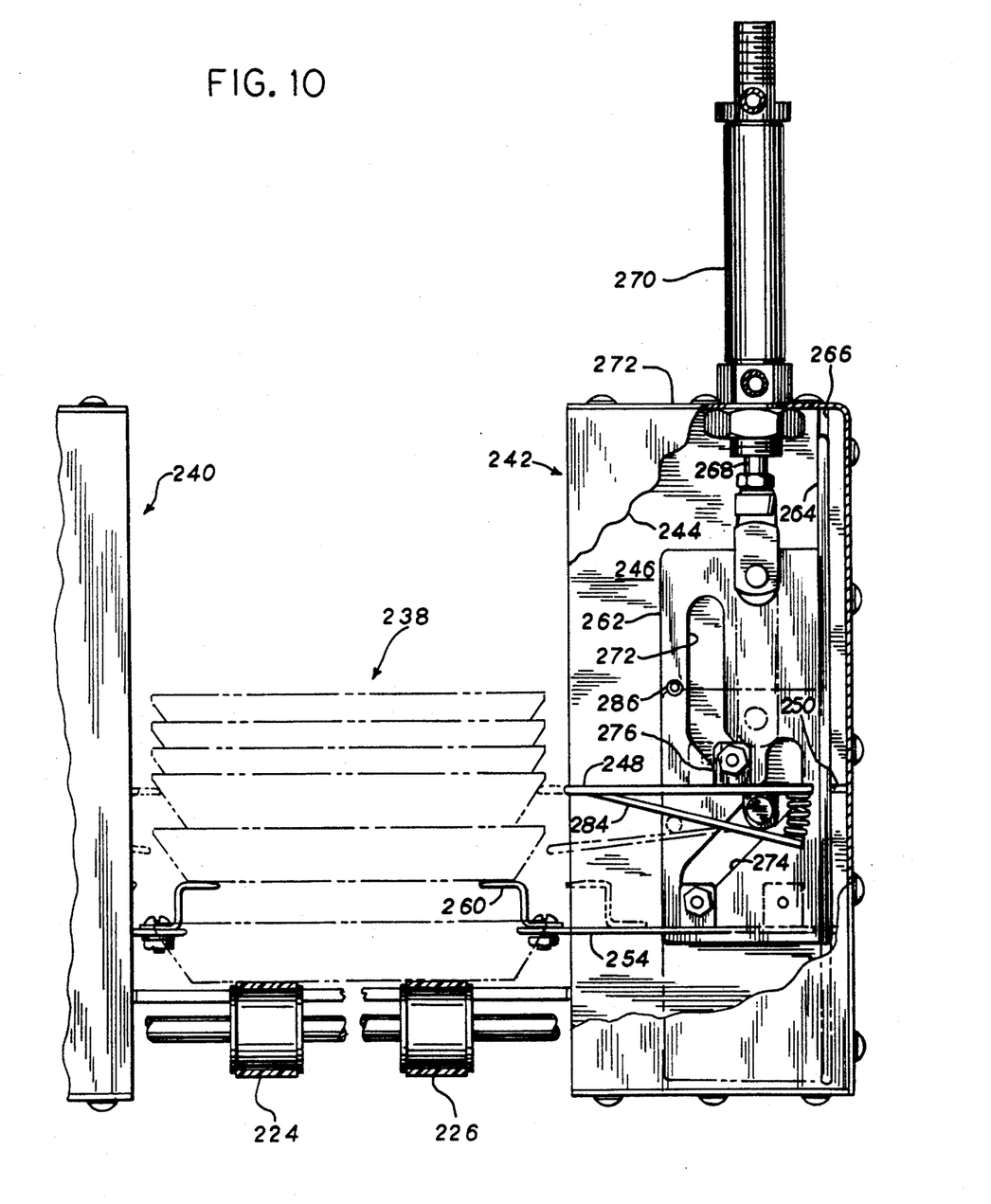
FIG. 10 is a partial sectional view taken generally along line 10—10 of FIG. 1.
Figure 11:
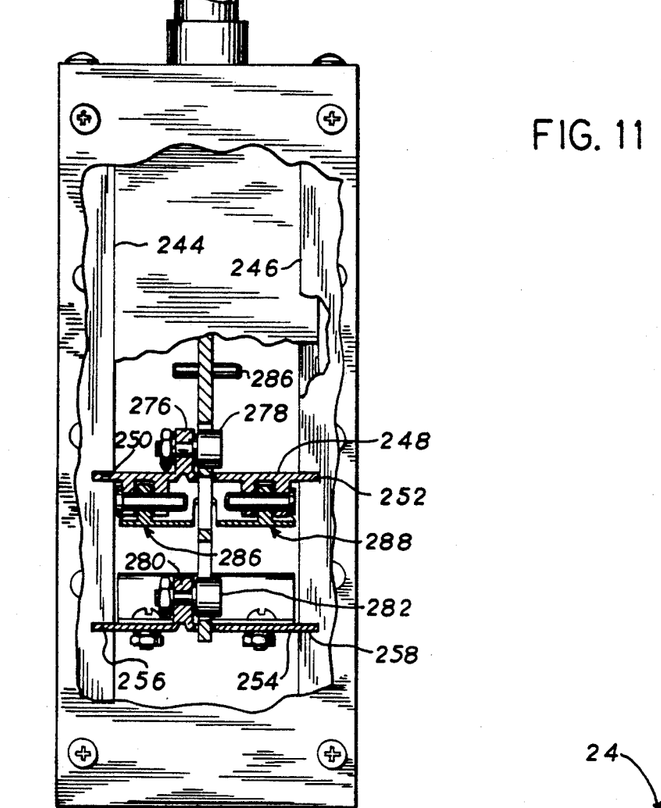
FIG. 11 is a broken away end elevation view of the tray supply dispensing system shown in FIG. 10.

Reference is now made to FIGS. 10 and 11 for an explanation of the mechanism for dispensing trays from hopper 222 onto belts 224, 226.

As shown in FIG. 10, a stack of empty foam trays is shown at 238. Stack 238 is received between a pair of spaced identically constructed dispensing units 240, 242, which define hopper 222. Guides are preferably connected to units 240, 242 for maintaining stack 238 longitudinally in position.

Dispensing unit 242 will be described in detail, it being understood that dispensing unit 240 is identically constructed. Unit 242 includes a pair of spaced side plates 224, 246. An upper horizontal retainer plate 248 is mounted in facing slots 250, 252 (FIG. 11) formed in side plates 244, 246, respectively. A lower retainer plate 254 is mounted in a pair of horizontal slots 256, 258 formed in side plates 244, 246, respectively. A bracket member 260 is mounted at the outer end of lower plate 254.

An actuator plate 262 is connected to a rear plate 264 slidably mounted in a pair of vertical slots, such as shown at 266, formed inside plates 244, 246. Actuator plate 262 is connected through a clevis pin arrangement to the rod 268 of a pneumatic cylinder 270, which is mounted to a top cover 272 extending between the upper ends of side plates 244, 246. Actuator plate 262 is provided with a pair of cam slots 272, 274. Upper retainer plate 248 is mounted in cam slot 272 through a bracket 276 and a cam follower 278. Similarly, lower retainer plate 254 is mounted in cam slot 274 by a bracket 280 and a cam follower 282.

A flipper plate 284 is pivotably connected by a pair of bracket and pin arrangements, shown at 286, 288, to the underside of upper retainer plate 248.

Operation of dispensing unit 242 is as follows, it being understood that dispensing unit 240 operates in the same manner simultaneously with dispensing unit 242. In the ready position, upper retainer plate 248 and lower retainer plate 254 are in the positions shown in solid lines in FIG. 10. In this position, bracket 260 connected to lower retainer plate 254 engages the underside of the lowermost tray in stack 238 for supporting the stack thereabove. Upper retainer plate is retracted so as not to engage any of the trays in stack 238. When the tray shown as resting on belts 224, 226 is conveyed away toward receiving station 236, a photoeye senses when another tray is to be dropped onto belts 224, 226, and sends a signal to an actuator which supplies air pressure to pneumatic cylinder 270 so as to extend its rod 268. When this occurs, downward movement of actuator plate 262 results. During such downward movement of actuator plate 262, upper and lower retainer plates 248, 254 are maintained at the elevation as shown. As to upper retainer plate 248, its cam follower 278 rides within slot 272 so as to extend upper plate 248 outwardly to engage the side of the tray above the lowermost tray in stack 238, as shown in phantom. As to lower retainer plate 254, its cam follower 282 rides in slot 274 so as to retract lower retainer plate 254 to the position as shown in phantom. When this occurs, the lowermost tray in stack 238 is released therefrom, and is caused to fall onto belts 224, 226 by gravity. A pin 286 mounted to actuator plate 262 engages the upper surface of flipper plate 284 and forces flipper plate 284 to its downward position as shown in phantom. This action of flipper plate 284 provides a positive release of the lowermost tray from stack 238, essentially "kicking" it onto belts 224, 226. Rod 268 is then retracted, which results in return of upper and lower retainer plates 248, 254 to their solid line positions, and the tray which was engaged by upper retainer plate 248 falls onto bracket 260 and is supported thereby in preparation for another dispensing cycle.

Bracket 260 can be positioned to varying elevations above plate 254 for accomodating different height of trays to be dispensed.

Referring to FIGS. 5 and 9, the trays dispensed onto belts 224, 226 are conveyed toward receiving station 236 until the leading edge of the forwardmost tray contacts a stop 288 formed on a sheet metal assembly provided at receiving station 236. The sheet metal assembly overhangs a pusher block 290 which is connected to the extendable and retractable rod of a pneumatic cylinder 292.

As noted previously, a tray conveyor belt 164 is driven by a drive roller 162 and is trained about a rear idle roller 294. The trailing end of tray conveyor 164 is located just downstream of receiving station 236. Tray conveyor 164 conveys the empty trays forwardly at the same rate of speed as the portioned ground meat conveyed on conveyor 15. The discharge of the trays from tray conveyor 16 positions an empty tray immediately below the portioned ground meat supplied to the discharge of conveyor 150, with the timing being such that the leading edge of a ground meat portion is placed at the leading edge of the tray. As shown in FIG. 2, a ground meat portion, shown at 296, is being deposited into a tray 298. When portion 296 is in approximately the position shown, pneumatic cylinder 292 is actuated so as to extend pusher block 290 and engage the tray at receiving station 236. This pushes the tray at receiving station 236 onto tray conveyor belt 164 and bumps it against the tray already on belt 164, which kicks tray 298 forwardly so as to assist in completing severing portion 296 from the meat remaining on conveyor belt 150. This action also serves to place the leading edge of the tray trailing tray 298 in position for receiving the leading edge of the ground meat portion which trails portion 296, and places the tray which was at receiving station 236 onto the tray conveyor, in preparation for another cycle.

A wiper guide 300 is positioned immediately downstream of the discharge of conveyor belt 150, for assisting in wiping of meat off of conveyor belt 150 and also to aid in laying the ground meat portions into the trays. The wiper guide 300 is made of a material such as teflon, having a low coefficient of friction to prevent drag on the meat portions. By varying the length and angle of wiper guide 300, the release point of the trailing end of the meat portion can be carefully controlled to accurately position the meat portion in the tray.

Referring to FIG. 9, a depending gate 302 is provided on the sheet metal arrangement overhanging pusher block 290. The leading edge of gate 302 can also be seen in FIG. 5. Gate 302 acts to block the entrance to receiving station 236 upon extension of pusher block 290, so that no trays are supplied to receiving station 236 when cylinder 292 is actuated so as to move pusher block 290 forwardly. Upon full retraction of the rod of cylinder 292 and return of pusher block 290 to its position as shown in FIG. 2, gate 302 again opens the entryway to receiving station 236 so that another tray is supplied thereto by belts 224, 226.

Referring again to FIG. 8, it is seen that operation of pusher cylinder 292 is controlled by actuator 178. When actuator 178 is engaged by shuttle block 166 during forward movement of shuttle block 166, pressurized air is supplied through a line 304 so as to move valve 200 rightwardly. This cause extension of the rod of cylinder 292, and forward movement of pusher block 290. When actuator 186 is engaged and reverse movement of shuttle block 166 initiated, the supply of pressurized air to line 304 is cut off. Simultaneously, upon engagement of actuator 186, pressurized air is supplied through line 198 to the rightward end of valve 200, causing leftward movement of valve 200 and supply of pressurized air to the rod end of cylinder 292. This retracts the rod of cylinder 292, and returns pusher block 290 to its original position, as shown in FIG. 5.

Figure 12:
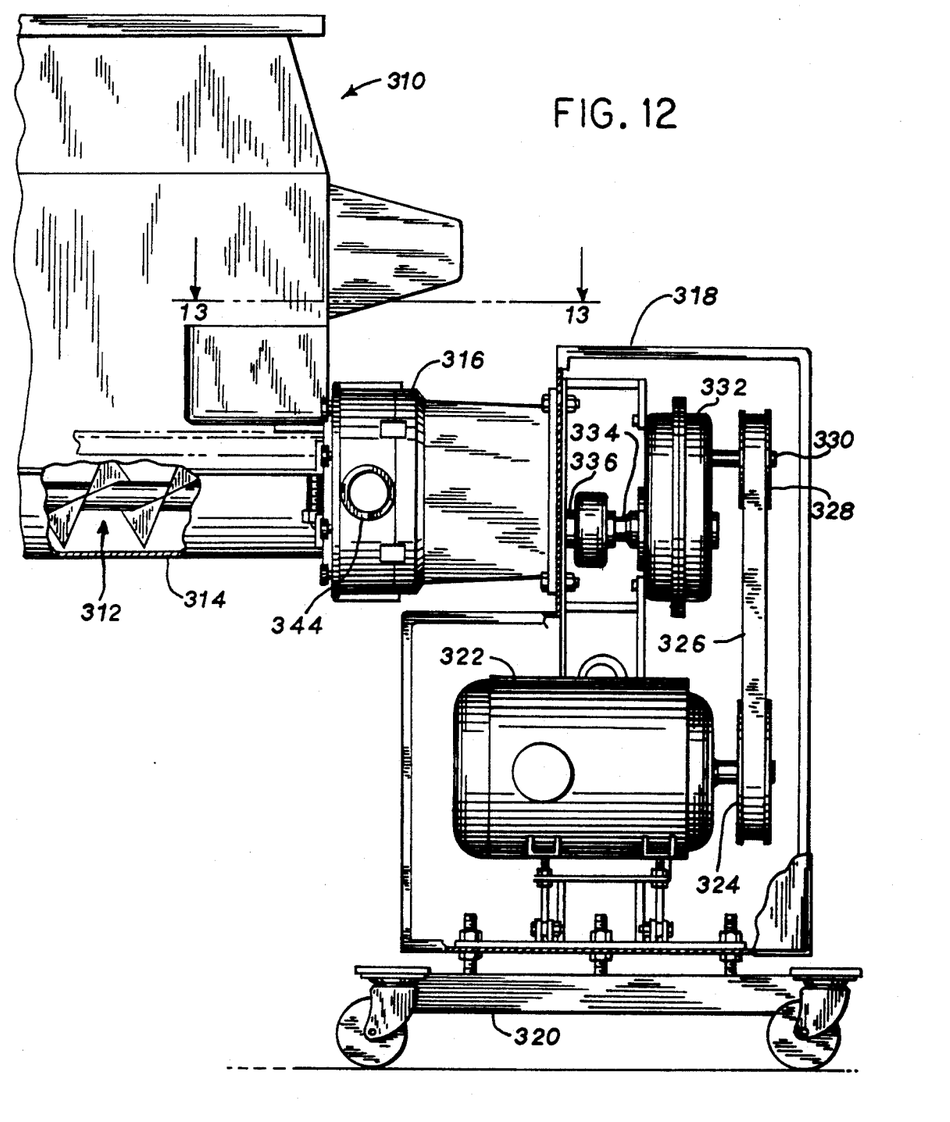
FIG. 12 is a side elevation view, partially in section, showing a portable pump system for use with an existing mixer, adapting it for use with the portioning system of the invention.
Figure 13:
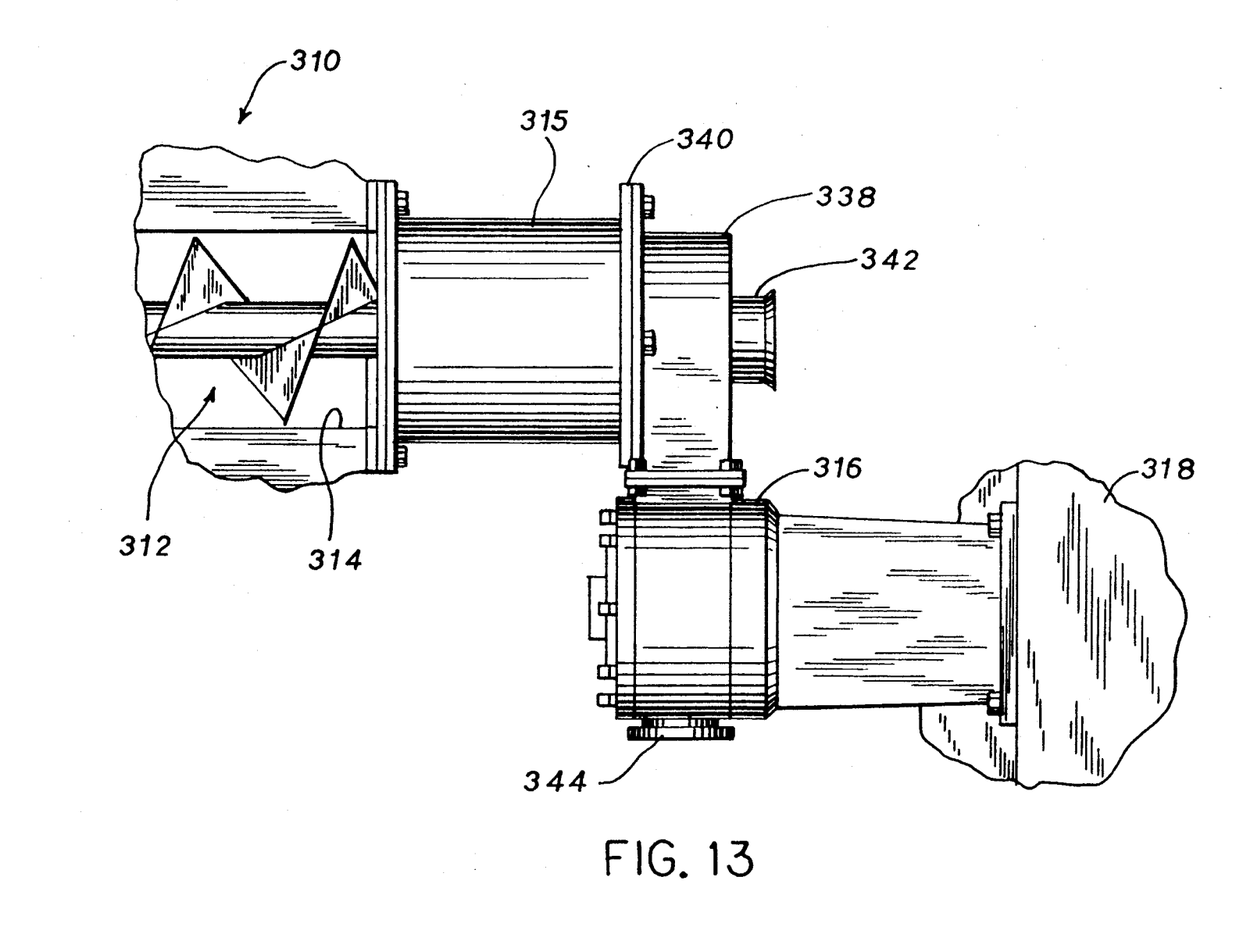
FIG. 13 is a partial top plan view, reference being made to line 13—13 of FIG. 12.

FIGS. 12 and 13 illustrate an arrangement for use with an existing mixer, shown at 310. This type of mixer may be any satisfactory mixer having an unload screw arrangement which discharges mixed meat from an outlet, such as that manufactured by the assignee of the present invention under its Model No. MG878. Mixer 310 includes an unload screw 312 rotatably supported within a discharge housing 314 having an outlet in its end.

A throat section 315 (FIG. 13) extends from the end of the mixer tub, and housing 314 feeds the mixed meat to throat section 315 for discharge through an outlet formed in throat section 315. Throat section 315 replaces a load/unload shroud normally provided on mixer 310, which accommodates loading meat into mixer 310 and unloading meat therefrom. Throat section 315 has a cross section identical to discharge housing 44 (FIGS. 1, 2) including a series of circumferentially spaced flutes. Additionally, the flighting of unload screw 312 is modified so as to provide more closely spaced flights within throat 315, similar to that shown in FIG. 3.

A pump 316, such as that described previously, is mounted to the wall of an enclosure 318 mounted to a wheel-supported cart 320. A motor 322 is mounted within enclosure 318, and is connected by a pulley 324, a belt 326 and a pulley 328 to the input shaft 330 of a reducer 332. The output shaft 334 of reducer 332 is coupled to the input shaft 336 of pump 316, for supplying power thereto.

As shown in FIG. 13, a shroud 338 has a flange 340 adapted for connection to the outlet of throat section 315, and includes a bearing assembly 342 for supporting the end of unload screw 312. Shroud 338 has its outlet connected to the inlet of pump 316. The outlet 344 of pump 316 is adapted for connection to a pipe or the like as described previously, for supplying mixed meat under positive pressure to a sizing head for use with the portioning system of the invention.

Various alternatives and embodiments are contemplated as being within the scope of the following claims particularly pointing out and distinctly claiming the subject matter regarded as the invention.

I claim:

1. A mechanism for depositing an article by gravity onto a surface, comprising:

a receptacle adapted to receive a stack of said articles; and dispensing means disposed toward the lower end of said receptacle for depositing said articles one-by-one onto a surface therebelow from the bottom of said stack of articles by allowing the lowermost article in said stack to fall onto said surface while supporting the articles above said lowermost article, said dispensing means comprising:

first movable stack supporting means movable into and out of engagement with the lowermost article in said stack;

second movable stack supporting means movable into and out of engagement with the article immediately above the lowermost article in said stack;

wherein movement of said second stack supporting means into engagement with the article above the lowermost article supports said article and the stack thereabove, and movement of said first stack supporting means out of engagement with said lowermost article allows said article to fall onto said surface by gravity, while said stack is retained by said second movable stack supporting means; and means for assisting in the separation of the lowermost article from said stack and for forcing said lowermost article downwardly onto said surface, wherein said means for assisting is associated with said second movable stack supporting means.

2. The mechanism of claim 1, wherein said second movable stack supporting means comprises a pair of movable members mounted for inward and outward movement in substantially horizontal slots formed in a pair of spaced side members, and actuator means for controlling the inward and outward movement of the movable members within said slots, and wherein said means for assisting comprises a flipper member pivotably mounted to each of the inwardly and outwardly movable members, said flipper member being selectively actuable upon outward movement of said movable members into engagement with the article above the lowermost article for simultaneously assisting in the downward movement of the lowermost article.

3. A mechanism for depositing an article by gravity onto a surface, comprising:

a receptacle adapted to receive a stack of said articles; and dispensing means disposed toward the lower end of said receptacle for depositing said articles one-by-one onto a surface therebelow from the bottom of said stack articles by allowing the lowermost article in said stack to fall onto said surface while supporting the articles above said lowermost article, said dispensing means comprising:

first movable stack supporting means movable into and out of engagement with the lowermost article in said stack;

second movable stack supporting means movable into and out of engagement with the article immediately above the lowermost article in said stack;

wherein movement of said second stack supporting means into engagement with the article above the lowermost article supports said article and the stack thereabove, and movement of said first stack supporting means out of engagment with said lowermost article allows said article to fall onto said surface by gravity, while said stack is retained by said second movable stack supporting means;

wherein said first movable stack supporting means and said second movable stack supporting means each comprise spaced pairs of movable members, with said stack disposed therebetween;

wherein each movable member is mounted for inward and outward movement within, and guided by, substantially horizontal slots formed in a pair of spaced plates; and actuator means for controlling inward and outward movement of each movable member in said slots.

4. A mechanism for depositing an article by gravity onto a surface, comprising:

a receptacle adapted to receive a stack of said articles; and dispensing means disposed toward the lower end of said receptacle for depositing said articles one-by-one onto a surface therebelow from the bottom of said stack of articles by allowing the lowermost article in said stack to fall onto said surface while supporting the articles above said lowermost article, said dispensing means comprising:

first movable stack supporting means movable into and out of engagement with the lowermost article in said stack;

second movable stack supporting means movable into and out of engagement with the article immediately above the lowermost article in said stack;

wherein movement of said second stack supporting means into engagement with the article above the lowermost article supports said article and the stack thereabove, and movement of said first stack supporting means out of engagement with said lowermost article allows said article to fall onto said surface by gravity, while said stack is retained by said second movable stack supporting means;

wherein said first movable stack supporting means and said second movable stack supporting means each comprise spaced pairs of movable members, with said stack disposed therebetween, wherein said movable members are mounted for inward and outward movement in substantially horizontal slots formed in a pair of spaced plates; and actuator means for controlling inward and outward movement of each movable member in said slots; comprising an actuator plate having a pair of cam slots formed therein, and wherein said movable members are provided with cam followers rotatably mounted thereto and disposed within said cam slots, said actuator plate being movable vertically so as to control horizontal movement of said movable members within said substantially horizontal slots.

5. A mechanism for depositing an article by gravity onto a surface, comprising:

a receptacle adapted to receive a stack of said articles; and a dispensing arrangement disposed toward the lower end of said receptacle for depositing said articles one-by-one onto a surface therebelow from the bottom of said stack of articles, comprising:

first movable stack supporting means movable between a first extended position and a second retracted position, and including a plate member having a bracket member mounted thereto for engaging the underside of said lowermost article and for thereby solely supporting said stack thereabove when said first movable stack supporting means is in its first extended position, and wherein said first movable stack supporting means in its second retracted position is moved out of engagement with said stack, wherein the bracket member is mounted to the plate member so as to be positionable to varying elevations above the plate member for accommodating varying height of articles making up said stack;

second movable stack supporting means movable between a first extended position for engaging the article immediately above the lowermost article in said stack, and a second retracted position for disengaging said stack; and an actuator arrangement for moving said second stack supporting means to its first extended position while moving said first stack supporting means to its second retracted position to release the lowermost article in said stack, and for moving said second stack supporting means to its second retracted position while moving said first stack supporting means to its first extended position.

6. A mechanism for depositing an article by gravity onto a surface, comprising:

a receptacle adapted to receive a stack of said articles; and a dispensing arrangement disposed toward the lower end of said receptacle for depositing said articles one-by-one onto a surface therebelow from the bottom of said stack of articles, comprising:

first movable stack supporting means movable between a first extended position and a second retracted position, and including a first member located at a first predetermined elevation and a support member mounted to the first member for engaging the underside of said lowermost article and for solely supporting said stack thereabove when said first movable stack supporting means is in its first extended position, and wherein said first movable stack supporting means in its second retracted position is moved out of engagement with said stack;

second movable stack supporting means movable between a first extended position for engaging the article immediately above the lowermost article in said stack at a second predetermined elevation above said first elevation, and a second retracted position for disengaging said stack; and an actuator arrangement for moving said second stack supporting means to its first extended position while moving said first stack supporting means to its second retracted position to release the lowermost article in said stack, and for moving said second stack supporting means to its second retracted position while moving said first stack supporting means to its first extended position;

wherein said support member is mounted to said first member so as to be positionable to varying elevations relative to the first member for accommodating varying height of articles making up said stack.

* * * * *